No. 656,037.  
C. C. NEWELL.  
PRUNING IMPLEMENT.  
(Application filed Apr. 24, 1900.)
(No Model.)
Patented Aug. 14, 1900.
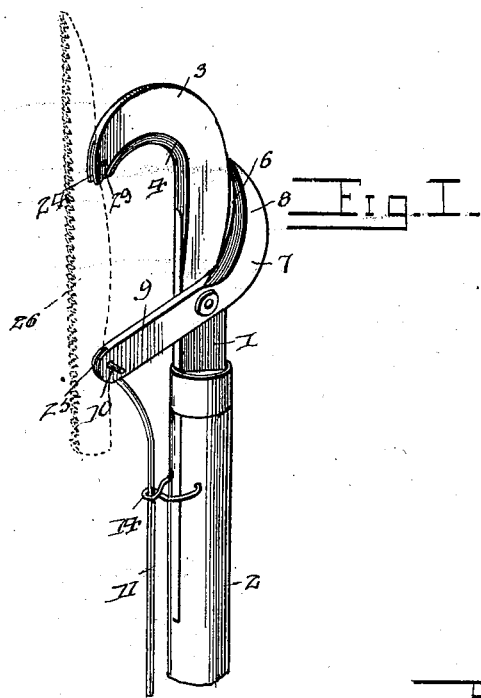
Fig. 1.
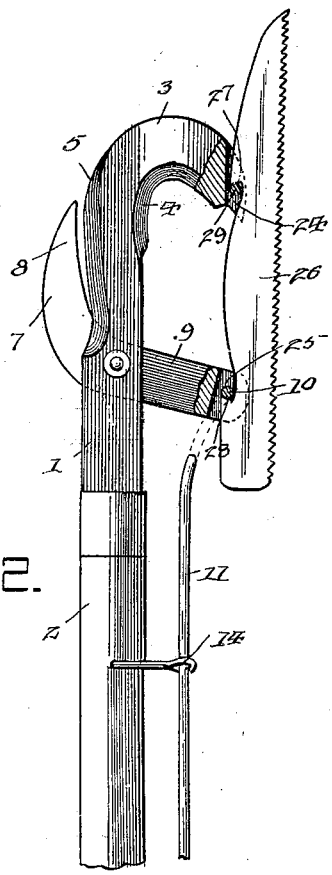
Fig. 2.
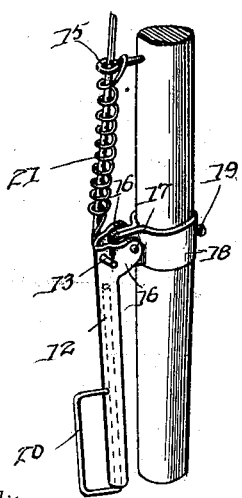
Fig. 3.
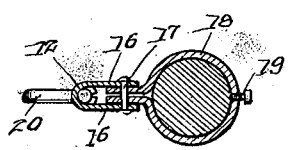
Witnesses  
F. E. Alden  
H. J. Riley
Charles C. Newell, Inventor  
By his Attorneys,  
C. A. Snow & Co.

UNITED STATES PATENT OFFICE.

CHARLES C. NEWELL, OF SALEM, MISSOURI.

PRUNING IMPLEMENT.

SPECIFICATION forming part of Letters Patent No. 656,037, dated August 14, 1900.

Application filed April 24, 1900. Serial No. 14,155. (No model.)

*To all whom it may concern:*

Be it known that I, CHARLES C. NEWELL, a citizen of the United States, residing at Salem, in the county of Dent and State of Missouri, have invented certain new and useful Improvements in Pruning Implements, of which the following is a specification.

The invention relates to improvements in pruning implements.

The object of the present invention is to improve the construction of that class of pruning implements which employ blades at the end of a pole and which are adapted for trimming trees and to provide a simple, inexpensive, and efficient one which will be light, strong, and durable and which will be adapted for detachably holding a saw in convenient position for cutting off large limbs.

The invention consists in the construction and novel combination and arrangement of parts hereinafter fully described, illustrated in the accompanying drawings, and pointed out in the claims hereto appended.

In the drawings, Figure 1 is a perspective view of a pruning implement constructed in accordance with this invention, the saw being shown in dotted lines. Fig. 2 is a side elevation, partly in section, the saw being shown in full lines. Fig. 3 is a transverse sectional view illustrating the manner of mounting the operating-lever on the pole.

Like numerals of reference designate corresponding parts in all the figures of the drawings.

1 designates a shank or bar mounted in a suitable slot or bifurcation of the outer end of a pole 2 and having its outer end curved to form a hook 3. The shank or bar is provided with cutting edges 4 and 5, arranged, respectively, at the concave edge of the hook and at the opposite edge of the straight portion of the shank or bar, as clearly shown in Fig. 2. The curved portion or hook is beveled at opposite sides to form the cutting edge 4, which is adapted for thinning out bushes, shrubbery, and the like. The other cutting edge 5 coöperates with the cutting edge 6 of a pivoted cutting-lever 7, fulcrumed between its ends and having its arm 8 located contiguous to the cutting edge 5 and having its inner edge beveled to form the cutting edge 6. The straight portion of the shank or bar is beveled at one side to form the cutting edge 5, and the cutting-lever is beveled at its opposite face to form the cutting edge 6, the two members or parts operating similar to a pair of shears and adapted to cut a limb or tree from the opposite sides thereof, whereby the fiber of the wood is more or less compressed to close the pores and assist in healing a plant or tree. The other arm 9 of the lever is secured by a suitable pivot 10 to the upper end of a connecting-rod 11, which extends to an operating-lever 12, and the terminals of the connecting-rod are preferably bent outward to form the pivots 10 and 13 for attaching the rod 11 to the cutting and operating levers. The connecting-rod passes through upper and lower guides 14 and 15, and the operating-lever 12, which is of bell-crank form, is provided at its inner or upper end with a short arm composed of two sides 16, which are pivoted by a rivet 17 or other suitable fastening device to the outturned terminals of a ferrule or band 18. The operating-lever may be constructed of sheet metal folded longitudinally, as indicated in Fig. 3 of the accompanying drawings. The ferrule 18 is secured to the pole by a set-screw 19, and the outer end of the operating-lever is provided with a suitable handle or grip portion. The sheet metal of the operating-lever may be rolled beyond the sides 16, and the loop 20 may consist of a wire having one end arranged within the rolled portion of the lever, and its outer portion is bent to form the loop 20. The operating-lever is connected with one end of a coiled spring 21, disposed on the lower portion of the connecting-rod and having its other or inner end secured to the lower guide 15. The spring operates to open the cutting-lever, when it is free to act.

The outer end of the shank or bar is provided with a bifurcation or recess 24, and the arm 9 of the cutting-lever is provided with a corresponding recess 25, and these recesses or bifurcations are adapted to receive a saw-blade 26, which is cut away at the back to provide opposite shoulders 27 and 28. The shoulders 27 and 28 of the saw-blade are engaged by suitable stops or shoulders of the shank or bar and the cutting-lever. The pivot 10, which extends through the slot or bifurcation of the cutting-lever, constitutes the means for engaging the shoulder 28, and the shoulder 27 is engaged by a transverse fastening device 29. The saw-blade is firmly and detachably clamped on the two members of the pruning implement by pressing the operating-lever against the inner handle portion of the rod, and as the shoulders 27 and 28 converge toward the rear edge of the blade there is no liability of the latter being accidentally released. The saw-blade is held in convenient position for use and is adapted for operating on large limbs, and it may be quickly placed in position and removed therefrom.

It will be seen that the pruning implement is exceedingly simple and inexpensive in construction, that it is light, strong, and durable, and that it may be conveniently operated on thick clustered trees and on thick shrubbery and bushes. It will also be apparent that it is adapted for rapidly trimming trees and other plants and that the saw-blade is firmly and detachably held in position and may be quickly mounted on and removed from the stationary and movable cutting members of the device.

What I claim is—

1. In a device of the class described, the combination of the stationary and movable cutting members, a saw-blade detachably engaged by the said members, and operating mechanism connected with the movable cutting member and adapted to hold the saw-blade firmly in position, substantially as described.

2. In a device of the class described, the combination of the stationary and movable cutting members provided with recesses, a saw-blade detachably fitted in the said recesses and engaged by the said members, and operating mechanism connected with the movable member and retaining the saw-blade in place, substantially as described.

3. In a device of the class described, the combination of the stationary and movable cutting members provided with recesses or bifurcations, a saw-blade provided with opposite shoulders and fitted in the bifurcations or recesses, means carried by the cutting members for engaging the shoulders of the saw-blade, and operating mechanism connected with the movable member and holding the said stops in engagement with the said shoulders, substantially as described.

4. In a device of the class described, the combination of the shank or bar having a hook and provided at the outer end thereof with a bifurcation, a fastening device extending across the bifurcation, a cutting-lever having one end bifurcated, a connecting bar or rod having a pivot passing through the bifurcated portion of the lever, a saw-blade cut away at its back to provide converging shoulders to engage the said fastening device and the said pivot, and operating mechanism connected with the rod or bar, substantially as described.

5. In a device of the class described, the combination of two cutting members one of which is movable, a saw-blade detachably engaged by said members, and means for holding the movable member in a fixed position, substantially as described.

In testimony that I claim the foregoing as my own I have hereto affixed my signature in the presence of two witnesses.

CHARLES C. NEWELL.

Witnesses:
A. H. LOVE,
WM. C. HILL.